(12) United States Patent
Wells et al.

(10) Patent No.: US 12,552,594 B2
(45) Date of Patent: Feb. 17, 2026

(54) MULTI-STAGE RAM ASSEMBLY FOR PRODUCT DELIVERY

(71) Applicant: Transportation IP Holdings, LLC, Norwalk, CT (US)

(72) Inventors: Nathan Wells, West Allis, WI (US); Nathan Felix, Slinger, WI (US)

(73) Assignee: Transportation IP Holdings, LLC, Norwalk, CT (US)

( * ) Notice: Subject to any disclaimer, the term of this patent is extended or adjusted under 35 U.S.C. 154(b) by 189 days.

(21) Appl. No.: 18/491,668

(22) Filed: Oct. 20, 2023

(65) Prior Publication Data

US 2024/0174426 A1 May 30, 2024

Related U.S. Application Data

(60) Provisional application No. 63/428,385, filed on Nov. 28, 2022.

(51) Int. Cl.
B65D 83/76 (2025.01)

(52) U.S. Cl.
CPC ...... *B65D 83/76* (2025.01); *B65D 2583/0481* (2013.01)

(58) Field of Classification Search
CPC B65G 25/08; B65G 47/1471; B65G 47/1478; B65D 83/76; B65D 2583/0481
USPC .......................................... 221/192
See application file for complete search history.

(56) References Cited

U.S. PATENT DOCUMENTS

| 3,384,007 | A | * | 5/1968 | Boje | ..................... B30B 9/3021 100/98 R |
| 3,621,775 | A | * | 11/1971 | Dedio et al. | .......... B30B 9/3025 100/269.07 |
| 3,799,051 | A | * | 3/1974 | Liberman | ............... B65F 3/201 100/269.09 |
| 3,854,397 | A | | 12/1974 | Dempster | |
| 4,646,633 | A | * | 3/1987 | Falguieres | .............. B30B 9/062 100/37 |
| 10,556,753 | B2 | | 2/2020 | Hellenbrand et al. | |
| 2004/0109791 | A1 | | 6/2004 | Itoh | |

FOREIGN PATENT DOCUMENTS

WO   2012167846 A1   12/2012

OTHER PUBLICATIONS

European Search Report dated Mar. 28, 2024 for corresponding European Patent Application No. 23209865.7.

\* cited by examiner

*Primary Examiner* — Leslie A Nicholson, III
(74) *Attorney, Agent, or Firm* — K&L Gates LLP

(57) ABSTRACT

Provided herein is an assembly including a first ram that can move along a surface in a trough toward an outlet of the trough to move product toward the outlet; a second ram that can be engaged by the first ram as the first ram moves along the surface in the trough, the second ram can be moved toward the outlet of the trough by the first ram; and an actuator that can move the first ram along the surface toward the outlet of the trough. In some embodiments, the first ram may be located between the surface in the trough and the second ram. Optionally, the actuator can engage with and move the first ram.

18 Claims, 12 Drawing Sheets

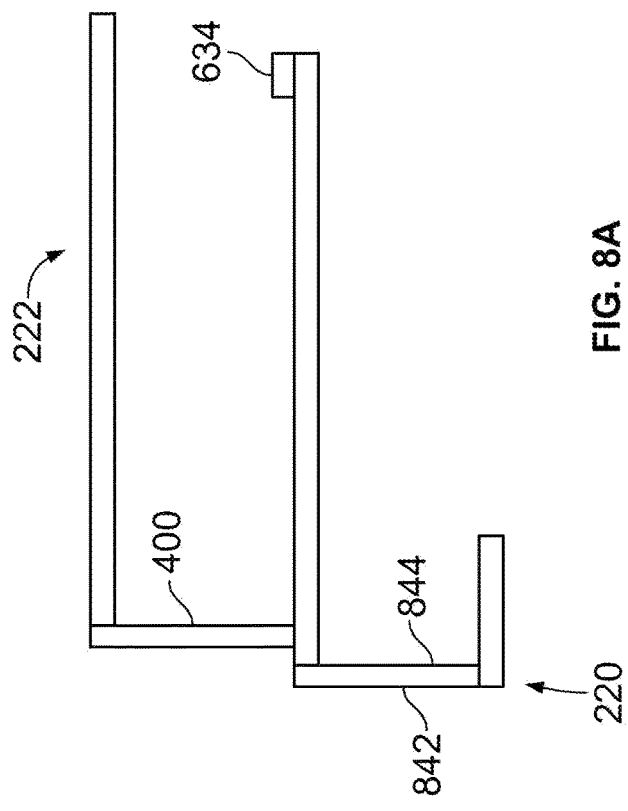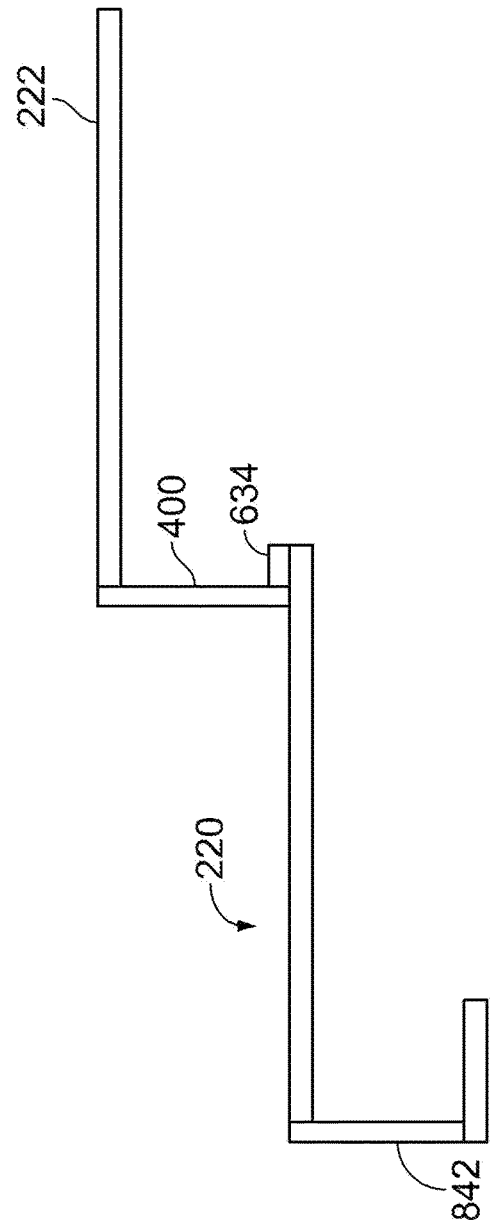

MULTI-STAGE RAM ASSEMBLY FOR PRODUCT DELIVERY

CROSS-REFERENCE TO RELATED APPLICATIONS

This application claims priority to U.S. Provisional Application No. 63/428,385 (filed 28 Nov. 2022), the entire disclosure of which is incorporated herein by reference.

BACKGROUND

Technical Field

The subject matter described herein relates to assemblies that separate and/or move products stored or held in bulk out of a container.

Discussion of Art

Various types of products can be stored or held in containers and then delivered out of the containers. For example, rail anchors (or anticreepers) can include steel clips attached to rail baseplates for holding and preventing longitudinal movement of a rail. The rail anchors may be stored in a container carried along a rail car. Some assemblies may have a ram that moves within the container to push the anchors out of the container to an operator. This operator can then grab and install the anchor on a rail. Other types of product such as ballast material, grain, building material, coal, rocks, spikes, etc. also may be held and distributed from containers in a similar manner.

Some currently known assemblies that push the product out of a container may use a single body (e.g., a ram) that moves to push some of the product to a location where a person can grab the product. One problem with these assemblies is that the single moving body can cause a tunneling or bridging problem whereby the product that is not moved by the body forms a tunnel around the path in which the body moves. This tunnel can prevent additional product from being contacted and moved by the body. Another problem with some known assemblies is that gaps or other volumes around the body can serve as locations for the product to become stuck and unable to be moved to the operator. This stuck product also can jam and prevent movement of the assembly. It may be desirable to have an assembly and method that differs from those that are currently available.

BRIEF DESCRIPTION

Provided herein is an assembly having a first ram that can move along a surface in a trough toward an outlet of the trough to move product toward the outlet; a second ram configured to be engaged by the first ram as the first ram moves along the surface in the trough, the second ram configured to be moved toward the outlet of the trough by the first ram; and an actuator configured to move the first ram along the surface toward the outlet of the trough.

Provided herein is a method including moving a first ram along a surface in a trough toward an outlet of the trough; engaging a second ram with the first ram as the first ram moves along the surface; moving both the first ram and the second ram along the surface following engagement of the second ram by the first ram; and moving product in the trough toward the outlet using the first ram and the second ram.

Provided herein is a system having a trough having a ramp surface leading to an outlet of the trough, the trough shaped to hold a product that is shaped to be moved from the trough via the outlet; and a single actuator, dual ram assembly operably coupled with the tough, the assembly includes a lower ram that can move along the ramp surface in the trough toward the outlet of the trough to move the product toward the outlet; an upper ram configured to be engaged by the lower ram as the lower ram moves along the ramp surface, the upper ram configured to be moved toward the outlet of the trough by the lower ram; and an actuator that can push the lower ram along the ramp surface toward the outlet of the trough and to pull the lower ram along the ramp surface away from the outlet of the trough.

BRIEF DESCRIPTION OF THE DRAWINGS

The subject matter may be understood from reading the following description of non-limiting embodiments, with reference to the attached drawings, wherein below:

FIG. 8A is a schematic cross-sectional view depicting one position of a multi-stage ram assembly;

FIG. 8B is a schematic cross-sectional view depicting another position of a multi-stage ram assembly;

DETAILED DESCRIPTION

Embodiments of the subject matter described herein relate to multi-stage ram assemblies and methods that operate to move product stored or held in bulk and moved out of a container while avoiding the tunneling or bridging problem and/or the stuck product problems described above. The assemblies may use multiple bodies, or rams, stacked on each other. These rams may interlock so that the rams can be moved by a single actuator to move the product to an operator. A suitable actuator may be a hydraulically powered cylinder, a motor, and the like.

The rams may move in stages such that different rams move different distances within the container holding the product. The stacking of the differently-moving rams can avoid or prevent the tunneling or bridging problem described above in that the rams may move at the same time and at different times such that the consistent back-and-forth movement of a commonly sized object that otherwise can cause tunneling or bridging is avoided. The rams may interlock with each other and/or the assembly can include additional bodies to prevent product from slipping between and around the rams to jam the assembly. Alternatively or additionally, instead of or in addition to stacked rams in the assembly, the assembly may include a conveyor belt, a corkscrew or screw, etc. to move product out of the container.

While one or more embodiments are described in connection with rail anchors used in connection with a rail vehicle system, not all embodiments are limited to rail anchors. Unless expressly disclaimed or stated otherwise, the subject matter described herein extends to other types of bulk product, such as spikes, ballast material, boxes, nails, coal, rock, aggregates, grain, corn husks, produce such as pumpkins, apples, etc.

Figure 1:
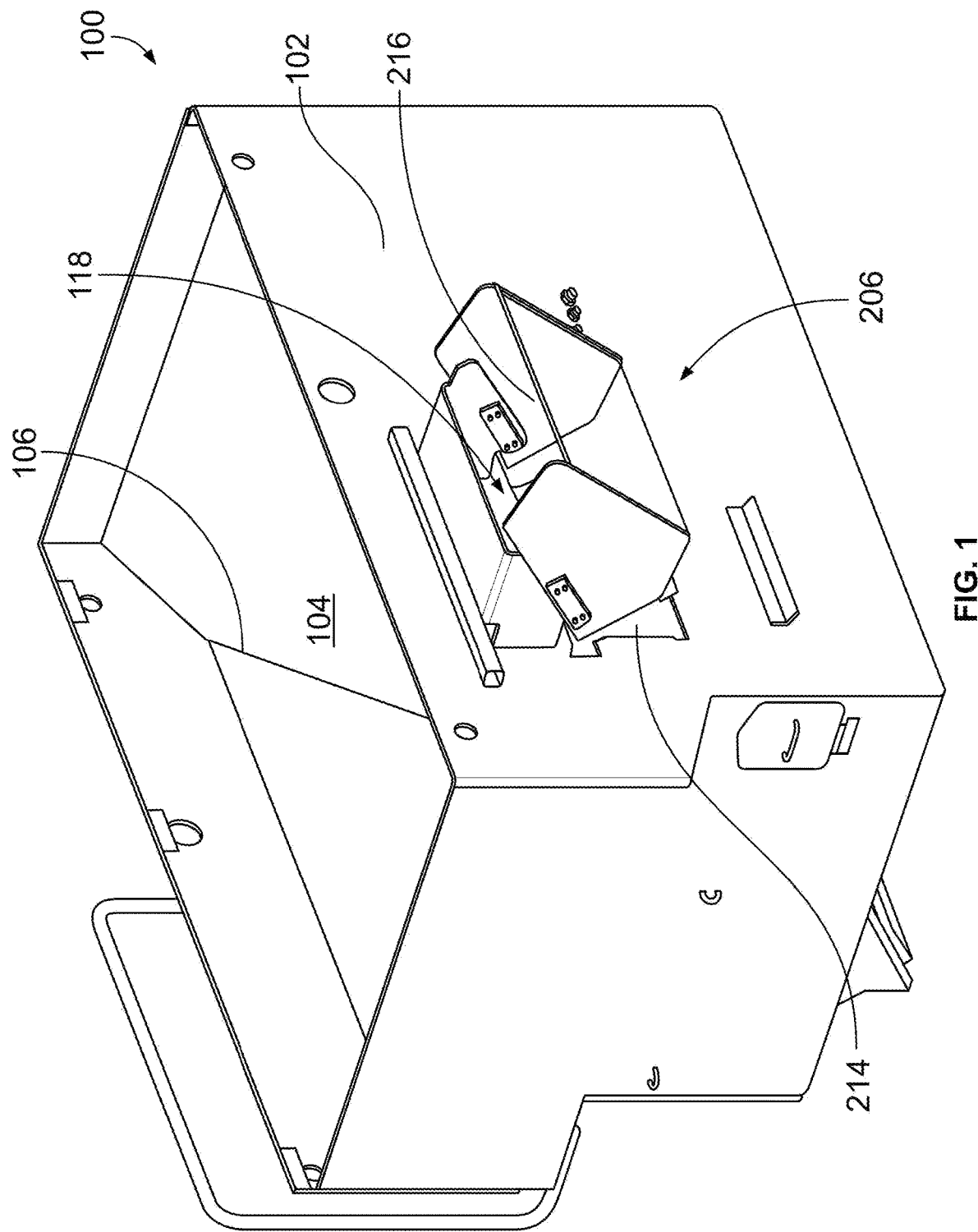
FIG. 1 is a perspective view of a product delivery system having a multi-stage ram assembly.
Figure 2:
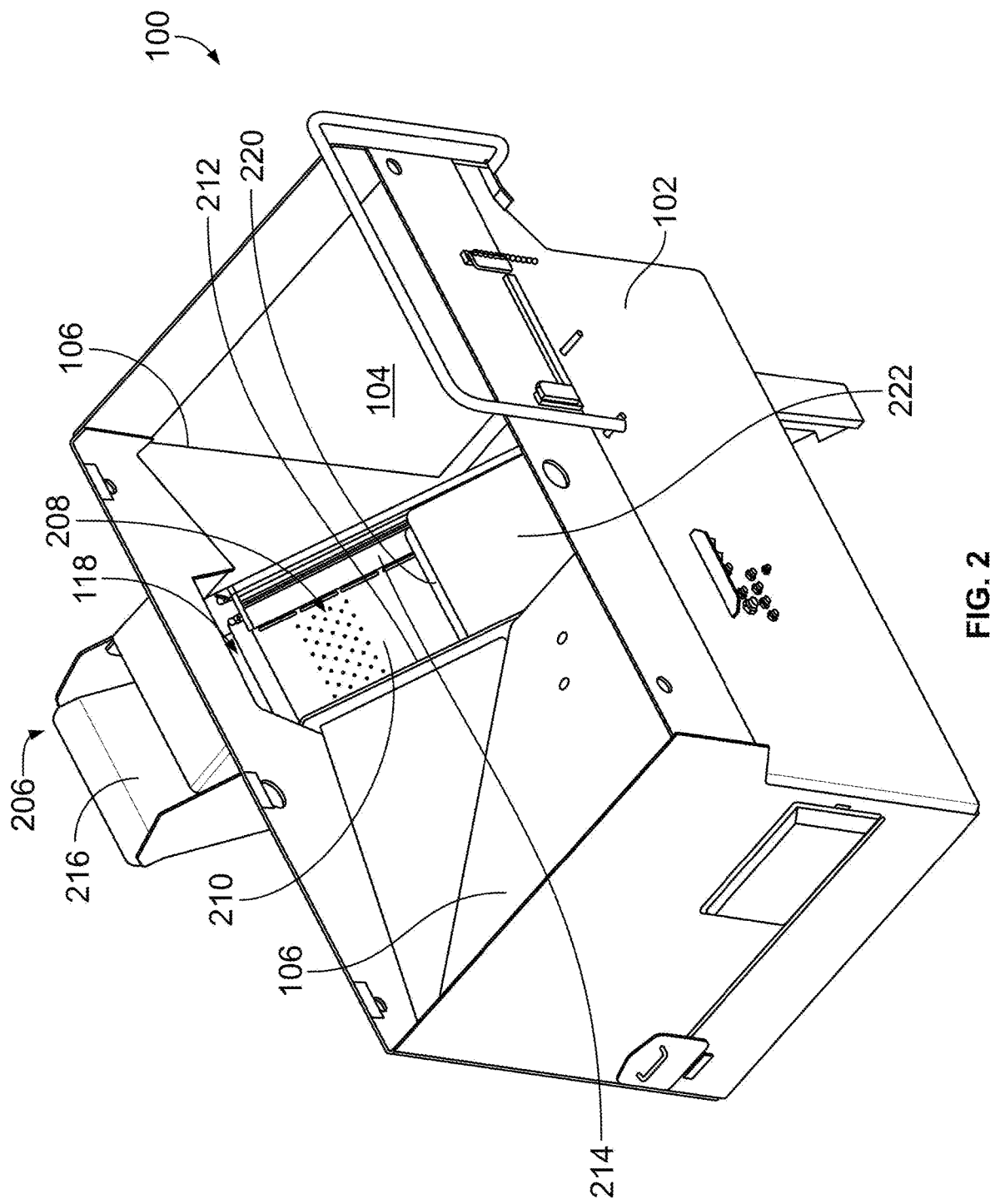
FIG. 2 is another perspective view of the product delivery system of FIG. 1.

FIG. 1 illustrates a first perspective view of one example of a product delivery system 100. FIG. 2 illustrates a second perspective view of the product delivery system. The product delivery system may include a container 102 that defines a volume 104 in which product, such as rail anchors (not shown), may be stored in bulk. The container may have a bottom and several sides with an open top or may be provided with a closed top. The container may include a multi-stage ram assembly 206, one example of which is visible in FIG. 2. The container can have slanted interior walls 106 configured to be in contact with the product and guide the product to the multi-stage ram assembly so that the product comes into contact with the multi-stage ram assembly. The product can be guided to the multi-stage ram assembly by gravity or it can directed to the multi-stage ram assembly through additional external force applied by machine, tool, or operator.

Referring to FIG. 2, the multi-stage ram assembly may include a trough 208 aligned in the container from the open top to the bottom. The trough can be a generally u-shaped elongated body formed of a lower surface 210 and sidewalls 212, 214 (shown in FIG. 2) extending from the lower surface on opposite sides. The trough can be provided with an outlet 216 located outside of the container. For example, the trough can extend through an opening 118 in the container through which the product inside the container can be obtained by an operator or robotic system once the multi-stage ram assembly has pushed the product to and/or through the opening in the container and/or the outlet of the trough.

Figure 3:
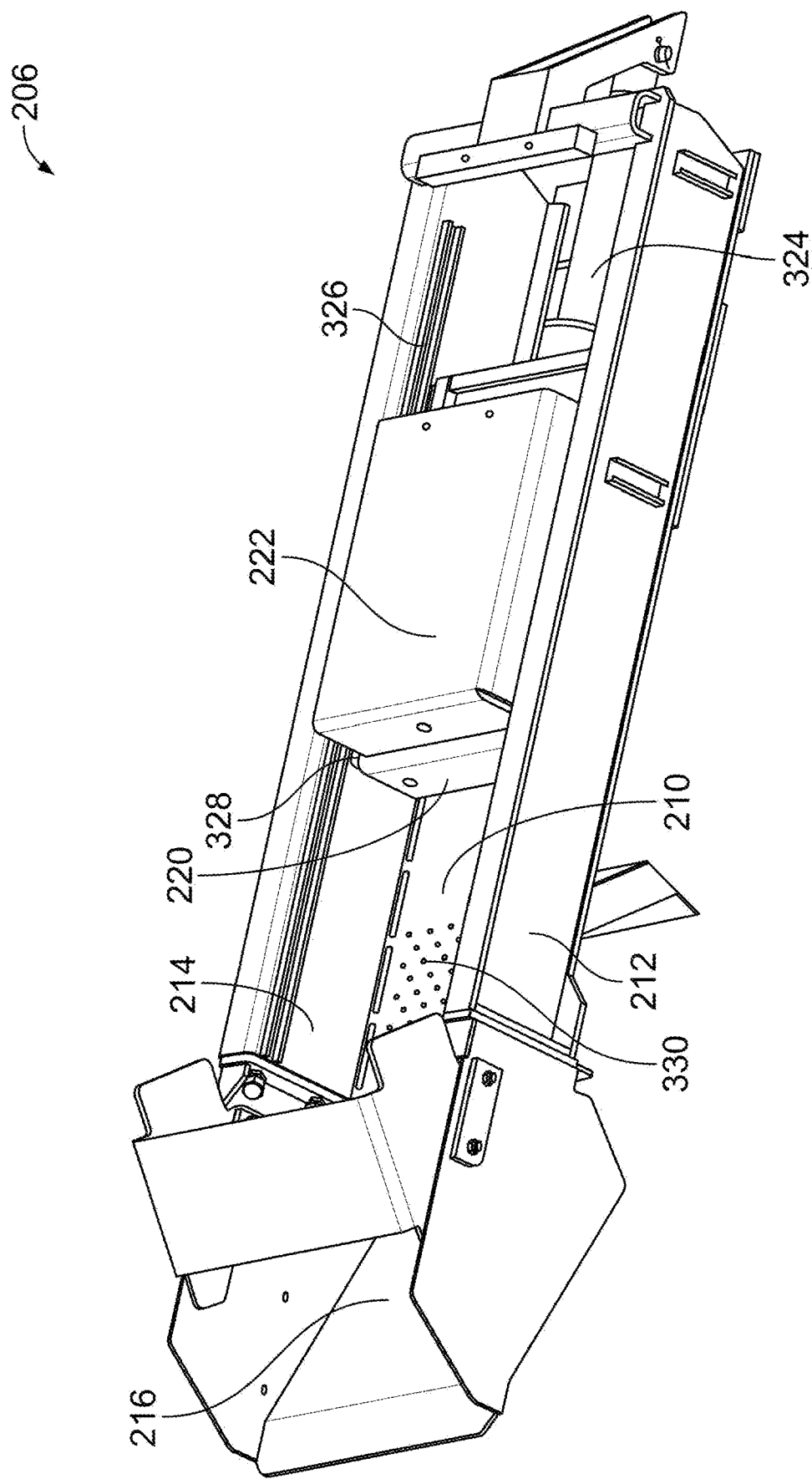
FIG. 3 is a perspective view of the multi-stage ram assembly of FIG. 1.
Figure 4:
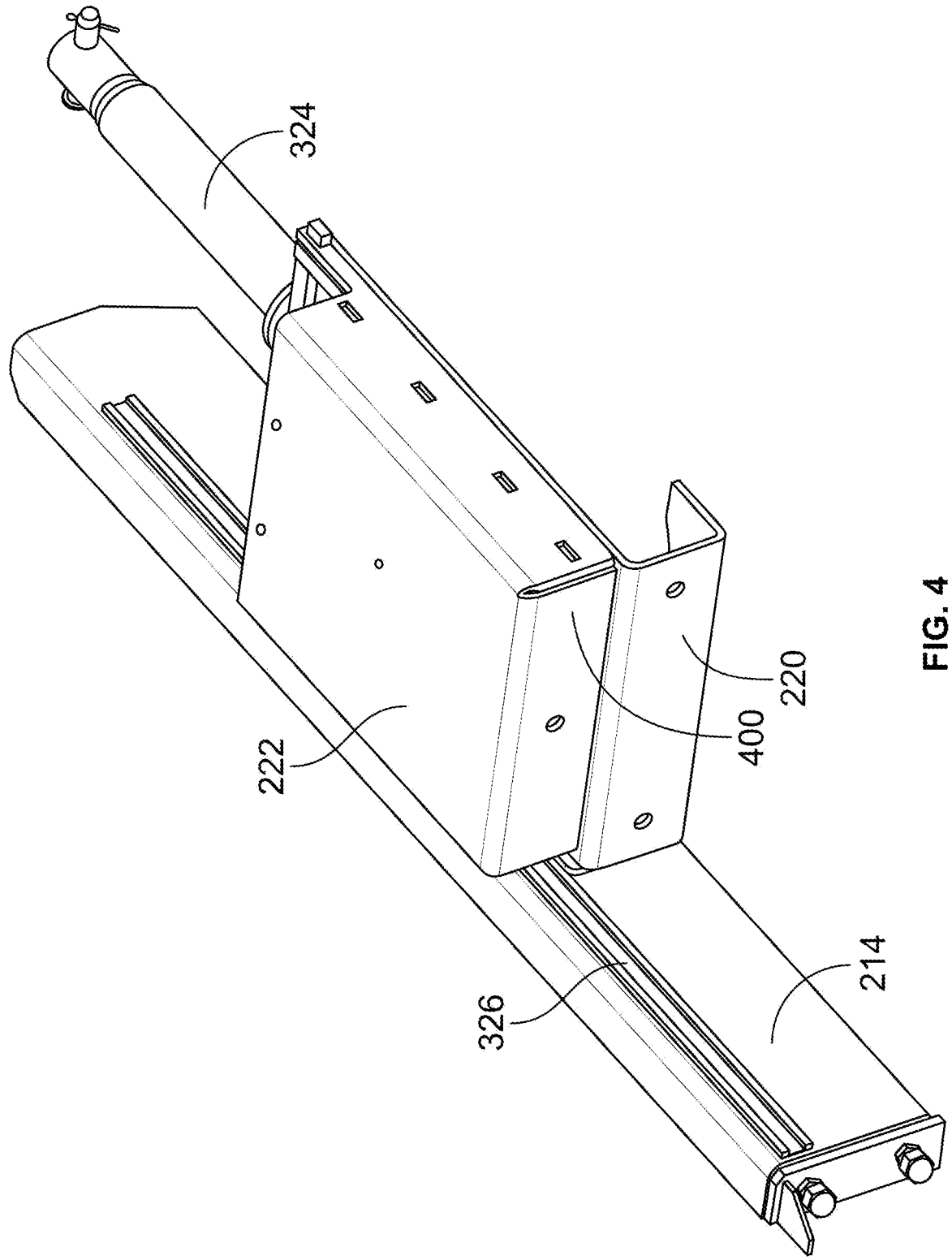
FIG. 4 is a perspective view of certain components of the multi-stage ram assembly of FIG. 3.

Turning to FIGS. 3 and 4, the multi-stage ram assembly may include a lower ram 220 and an upper ram 222 operably coupled to the trough. The lower ram can be positioned along the lower surface of the trough between the sidewalls. The lower ram can be positioned between the lower surface and the upper ram. The upper ram can move with respect to the lower ram. For description purposes, the lower ram and the upper ram are shown in FIG. 2 in a fully retracted or starting position. One or more actuators 324 may move in concert the lower ram and the upper ram along the trough 208 toward the outlet. The lower ram and the upper ram may move in a multi-stage manner with the lower ram and the upper ram moving in unison together from the starting position at one end of the trough to another position along the trough where the lower ram can move independently from the upper ram. In some embodiments, the position along the trough, referred to herein as the separation position, is located between the starting position and a final or extended position of the multi-stage ram assembly. At least one of the rams (e.g., the upper ram) may stop moving at the separation position while at least another of the rams (e.g., the lower ram) may continue moving in the trough (e.g., along the lower surface) toward the outlet. This ram that continues to move may move to the extended position, where the ram stops moving. This choreographed movement of the lower ram and the upper ram along the trough may move items of the product in the container toward and/or to the outlet for grasping by an operator or robotic system. While two rams are shown, optionally, the multi-stage ram assembly may include three or more rams.

During operation of the multi-stage ram assembly, the lower ram and the upper ram can move from the starting position to the fully extended position where the lower ram is in proximity to the opening. Upon command of the operator, the multi-stage ram assembly can move the lower ram and the upper ram from the fully extended position back to the starting position. For example, the lower ram may retreat in an opposite direction back down the lower surface. The lower ram may engage the upper ram at or near the separation position or location, and the lower ram and the upper ram may then move together down the lower surface of the trough toward the retracted or starting position. The lower ram and the upper ram can move in this cycle from the retracted/starting position or location, to the separation position or location, to the extended/ending position, back to the intermediate/separation position or location, and back to the retracted/starting position or location multiple times to repeatedly move different ones of the product up and out of the container. In some embodiments, the operator controls the movement of the multi-stage ram assembly one cycle at a time though a push-button or another input device.

The multi-stage ram assembly may move the lower ram and the upper ram using a single actuator in one example and as described herein. For example, the actuator may be coupled to the lower ram and may be the only component that operates or works to move the lower ram and the upper ram, or any additional ram provided, in the manners described herein. The actuator may be a hydraulic telescoping cylinder, a motor, or the like. The actuator may be directly connected with one ram but not directly connected with another ram. The actuator may push/pull or act on only one of the rams, with that ram engaging and moving the other ram between the multiple, different stages described herein. Alternatively, multiple actuators may be used. In one embodiment, multiple actuators may be placed parallel to each other and operably coupled to one of the rams or both rams. In another embodiment, multiple actuators may be configured in series to apply force to one of the rams or to both the rams.

FIG. 3 illustrates a perspective view of one example of the multi-stage ram assembly. FIG. 4 illustrates a first perspective view of the multi-stage ram assembly with the sidewall removed from view. The multi-stage ram assembly may be disposed within the container such that product in the container falls into or is otherwise positioned in the trough. As described above, the actuator may be used to push the lower ram and the upper ram up the inclined lower surface of the trough to push product in the trough up the lower surface to the outlet. The actuator is shown as a hydraulic cylinder that expands and contracts by telescoping to change in length. The actuator may extend in length to push the lower ram, which also pushes the upper ram, to move product up the trough to the outlet. The actuator may retract and shorten to pull the lower ram, and the upper ram, down the trough away from the outlet. Additional product may then fall into the trough so that the next cycle of the rams moving can push this additional product out of the container to the outlet.

The sidewalls of the trough 208 may each have a rail 326 oriented parallel to the lower surface and positioned at a distal location on the sidewalls from the lower surface. The upper ram may operably couple with the rails. For example, the upper ram may be formed with recesses in which the rails are disposed. The rails can guide and/or limit where the upper ram can move. For example, the rails may constrain movement of the upper ram to directions that are along or parallel to the rails. The rails may prevent the upper ram from moving in other directions, such as directions that are transverse and away from the lower surface of the trough.

Figure 5:
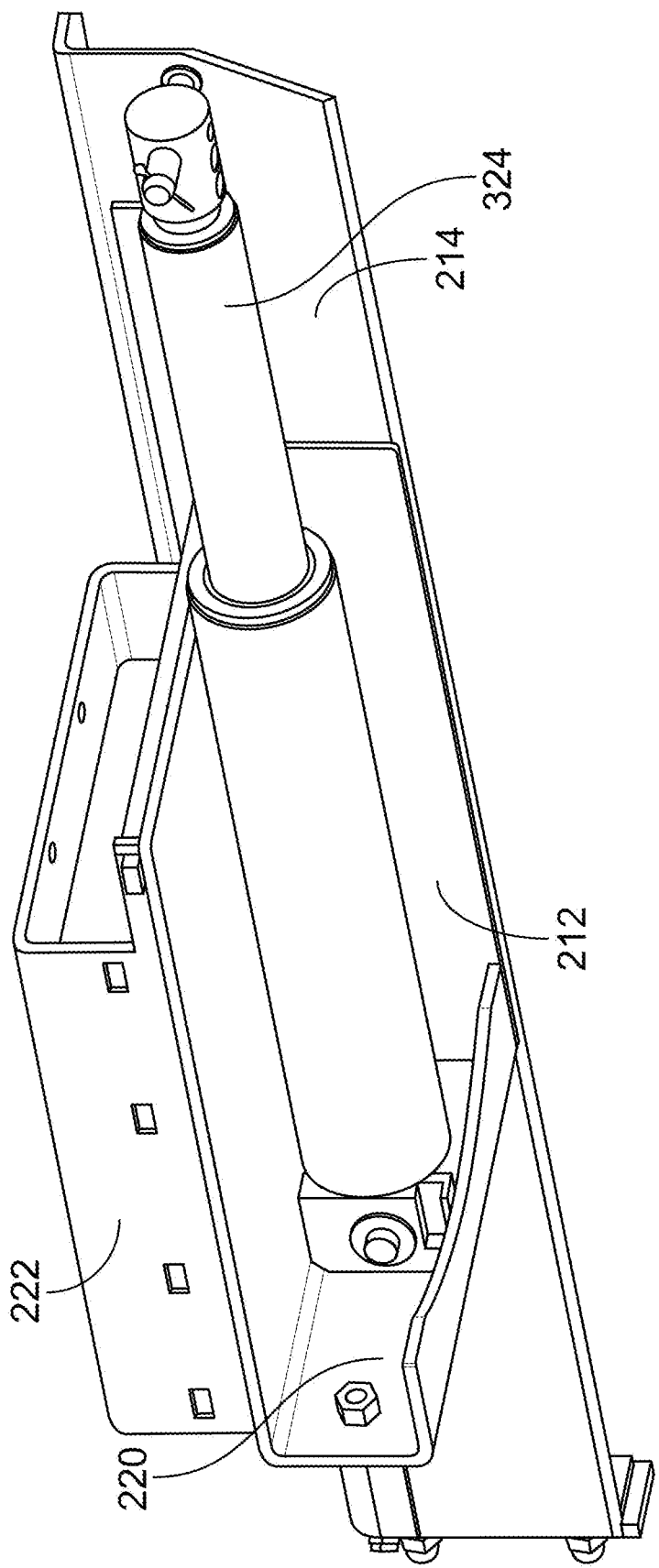
FIG. 5 is yet another perspective view of certain components of the multi-stage ram assembly of FIG. 3.

FIG. 5 illustrates another perspective view of one example of the multi-stage ram assembly with one sidewall and the lower surface of the trough removed and with the upper ram removed. As shown in FIG. 5, the actuator may be coupled with the lower ram only. The actuator may not contact, engage, mate, or couple with the upper ram. The actuator may extend in length to push the lower ram and may retract in length to pull the lower ram. As described above, the lower ram and the upper ram may slide relative to each other and may include components or structures that engage each other to allow the lower ram to push the upper ram to the intermediate or separation location while allowing the lower ram to continue being pushed up the trough while the upper ram remains stationary. These components may then also allow the lower ram to be pulled down the trough and engage the upper ram, and then pull the upper ram down the trough.

Figure 6:
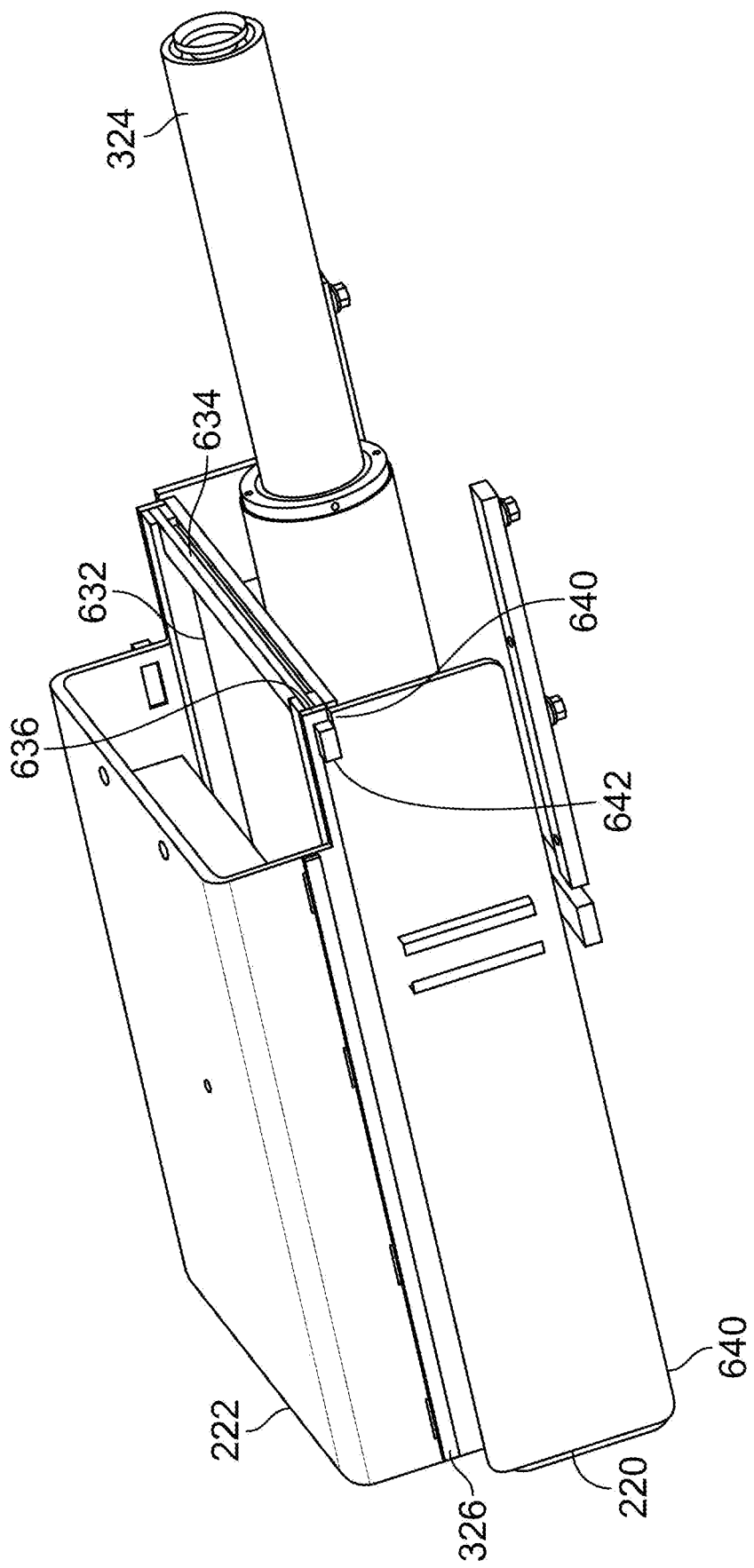
FIG. 6 is a perspective view of certain components of the multi-stage ram assembly of FIG. 3.

FIG. 6 illustrates another perspective view of one example of the upper ram, the lower ram, and the actuator. An upper surface 632 of the lower ram may face the upper ram. The upper ram may rest on or slidingly engage this upper surface of the lower ram during operation. The lower ram may include an upper projection 634 extending toward the upper ram from the upper surface. This upper projection is shown as an elongated bar extending perpendicular to the sidewalls across the body of the lower ram, but alternatively the upper projection may not extend across this entire body of the lower ram. The upper projection may have a generally rectangular shape, or in some embodiments may be a protruding structure have a circular, square, triangular or other shaped cross-section. As described below, the upper projection of the lower ram may engage a front face 400 (FIG. 2) of the upper ram as the lower ram is being moved (e.g., pushed) by the actuator to cause the movement of the lower ram and thereby also move the upper ram. The upper ram may be provided with a mating catch 636 located on an end of the upper ram. The mating catch can be a hook shaped structure and extend toward the lower ram.

As shown in FIG. 6, a lateral side 640 of the lower ram may include one or more cutouts 638 that form a step or notch in the lateral side. The cutout may be present in both lateral sides of the lower ram or only in one of the lateral sides. The cutout may be adapted to receive an engagement arm 642 of the upper ram to thereby couple the upper ram to the lower ram and allow the rams to move together over a portion of the travel up or down the trough. The engagement arm can be formed by bodies that extend or project from the upper ram. The engagement arm can be a bar, pin, or the like, shaped to be received in the cutout of the lower ram. The engagement arm can be integral with the mating catch. For example, as the actuator pulls the lower ram back in the trough toward the upper ram, the cutout in the lower ram can receive the engagement arm of the upper ram. Continued pulling on the lower ram by the actuator can cause the upper ram to also be pulled with the lower ram down the trough toward the actuator.

Figure 7:
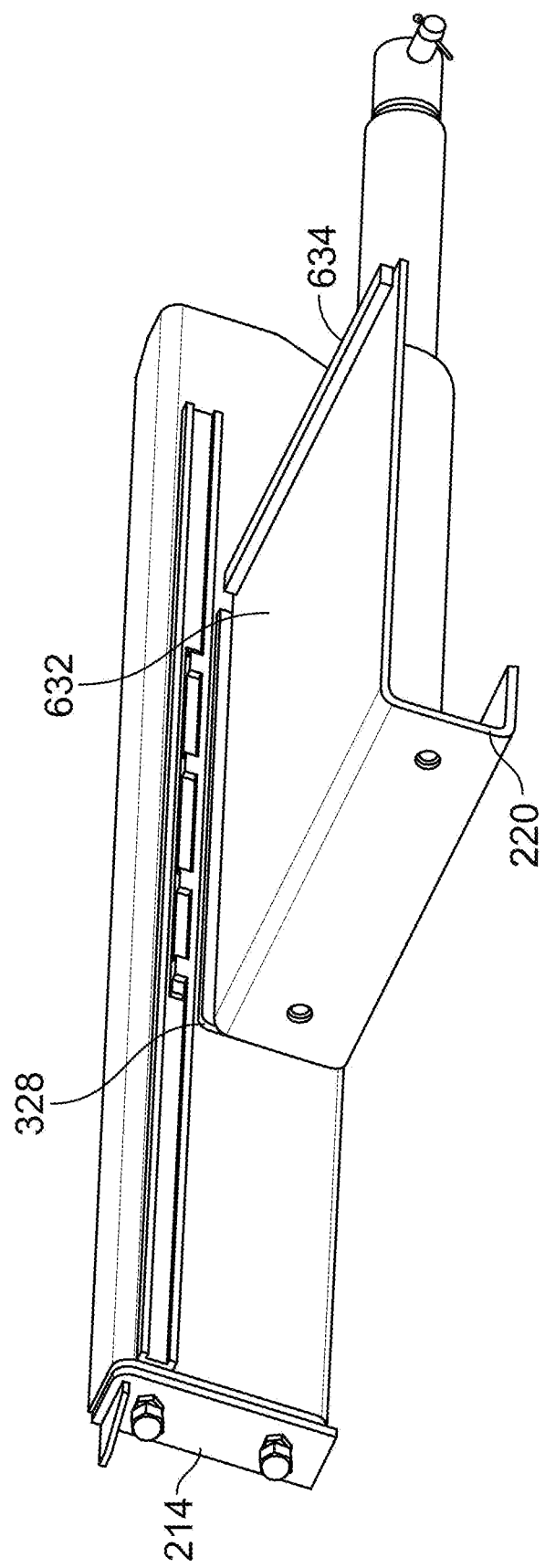
FIG. 7 is a perspective view of certain components of the multi-stage ram assembly of FIG. 3.

FIG. 7 illustrates a perspective view of the lower ram and the side rail. The lower ram and the upper ram may include one or more jam prevention bodies 328 disposed in one or more areas where gaps between the rams and the trough exist. In the illustrated example, the jam prevention bodies may be plates disposed between the opposite lateral sides of the lower ram and the sidewalls of the trough. These plates can fill gaps between the rams and the sidewalls. Without the plates, the product (e.g., anchors) could enter the gaps and jam or otherwise impede or prevent movement of the rams in the trough. The lower surface of the trough may include drain holes or orifices 330 (FIG. 3). These holes or orifices can allow debris (e.g., dust, dirt, etc.) and/or moisture to drain out or otherwise be removed from the trough.

FIGS. 8A through 9B schematically illustrate examples of different stages of movement of the lower ram and the upper ram during operation of the multi-stage ram assembly. As shown, the lower ram and the upper ram may be hollow bodies having the outer lateral sides. For the purposes of description, the lower ram and the upper ram are shown in FIGS. 8A and 8B without lateral sides to view interlocking or engaging features within the hollow body of the upper ram. Operation of the multi-stage ram assembly can be cyclic in motion. At the initial or stating position of the cycle, sometimes referred to herein as a fully retracted position, an external leading surface 842 of the lower ram may be ahead of the front face of the upper ram. The front face and the external leading surface may be the surfaces that engage and push the product in the trough 208 and out of the container via the outlet. The actuator may push on an inner leading surface 844 of the lower ram that is opposite the external leading surface of the lower ram. As the lower ram is pushed, the lower ram may move relative to the upper ram. For example, the upper ram may remain stationary in the trough as the lower ram is pushed by the actuator, or the upper ram may move (e.g., due to friction between the rams) but slower or to a lesser extent than the lower ram as the lower ram is moved by the actuator from the initial or starting position of the cycle.

The lower ram may move without the upper ram until the upper projection engages the front face of the upper ram. For example, the lower ram may move relative to the upper ram until the upper projection of the lower ram engages the front face of the upper ram, as shown in FIG. 8A. The upper projection may be referred to as an engagement surface as the upper projection may engage or contact this surface inside the upper ram. The front face of the upper ram may be referred to as a receptacle surface as this surface receives the engagement surface or the upper projection. Further pushing on the lower ram by the actuator may be translated into pushing on the upper ram through the interaction between the upper projection and the front face of the upper ram. For example, once the upper projection and the front face of the upper ram contact each other, continued movement of the lower ram up the trough toward the outlet also pushes the upper ram up the trough until the lower ram and upper ram reach a fully extended position of the operation cycle.

Figure 9A:
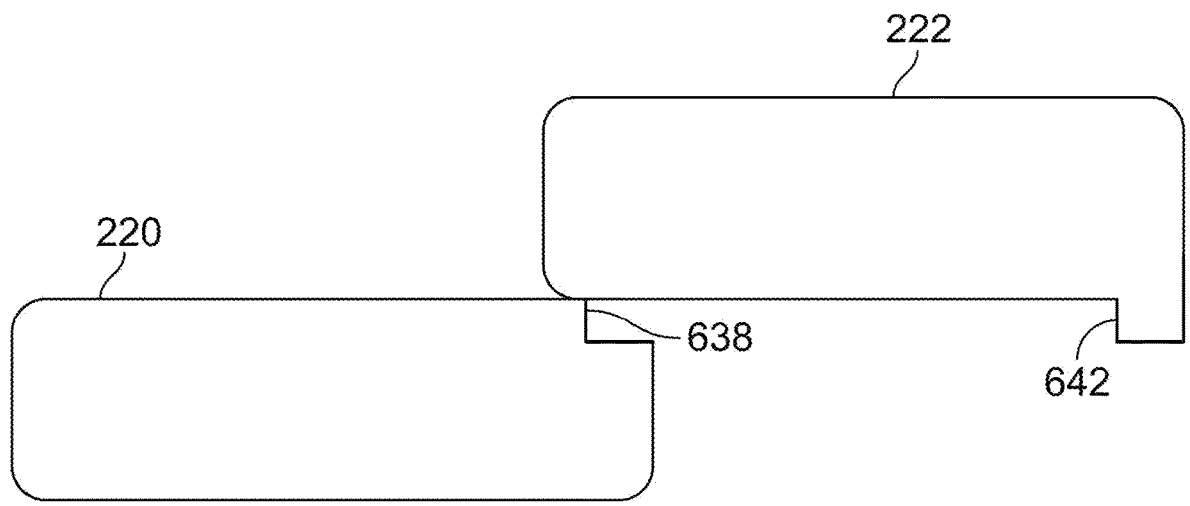
FIG. 9A is a schematic cross-sectional view depicting one position of a multi-stage ram assembly.
Figure 9B:
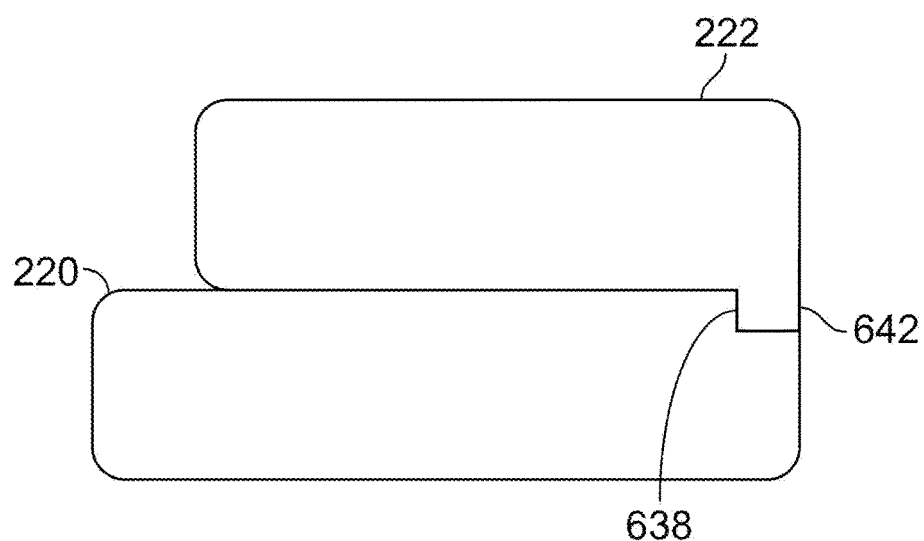
FIG. 9B is a schematic cross-sectional view depicting another position of a multi-stage ram assembly.

Turning now to FIGS. 9A and 9B, the operation of the multi-stage ram assembly may have a return cycle whereby the lower ram and the upper ram travel from the fully extended position of the cycle to the initial or starting position of the cycle. FIG. 9A is a schematic illustration depicting the position of the lower ram with respect to the upper ram when positioned in the fully extended position of the operation cycle. In the fully extended position, only a small portion of the lower ram and the upper ram may overlap. For example, the overlapping portion of the lower ram with respect to the upper ram may correspond to the size of the upper projection. For description purposes, the lower ram and the upper ram are depicted with lateral sides in FIGS. 9A and 9B to illustrate mating or interlocking features formed or coupled to the lateral sides. For example, the lower ram may be provided with a notch or cutout formed on a lateral side, for example the lateral side. The upper ram may be provided with a catch, for example, the engagement arm. When the multi-stage ram assembly is in the fully extended position, the cutout and the engagement arm are distanced between each other at a maximum length. As the multi-stage ram assembly begins the return of the lower ram and the upper ram to the initial or starting position of the cycle, the distance between the cutout and the engagement arm reduces until contact is made between the engagement arm and the cutout. Contact between the engagement arm and the cutout couples the upper ram to the lower ram to thereby allow transmission of force from the actuator from the lower ram to the upper ram. FIG. 9B depicts the lower ram and the upper ram in a coupled configuration. In the coupled configuration the upper ram can overlap the lower ram with substantially the full length of the body of the upper ram.

Figure 10:
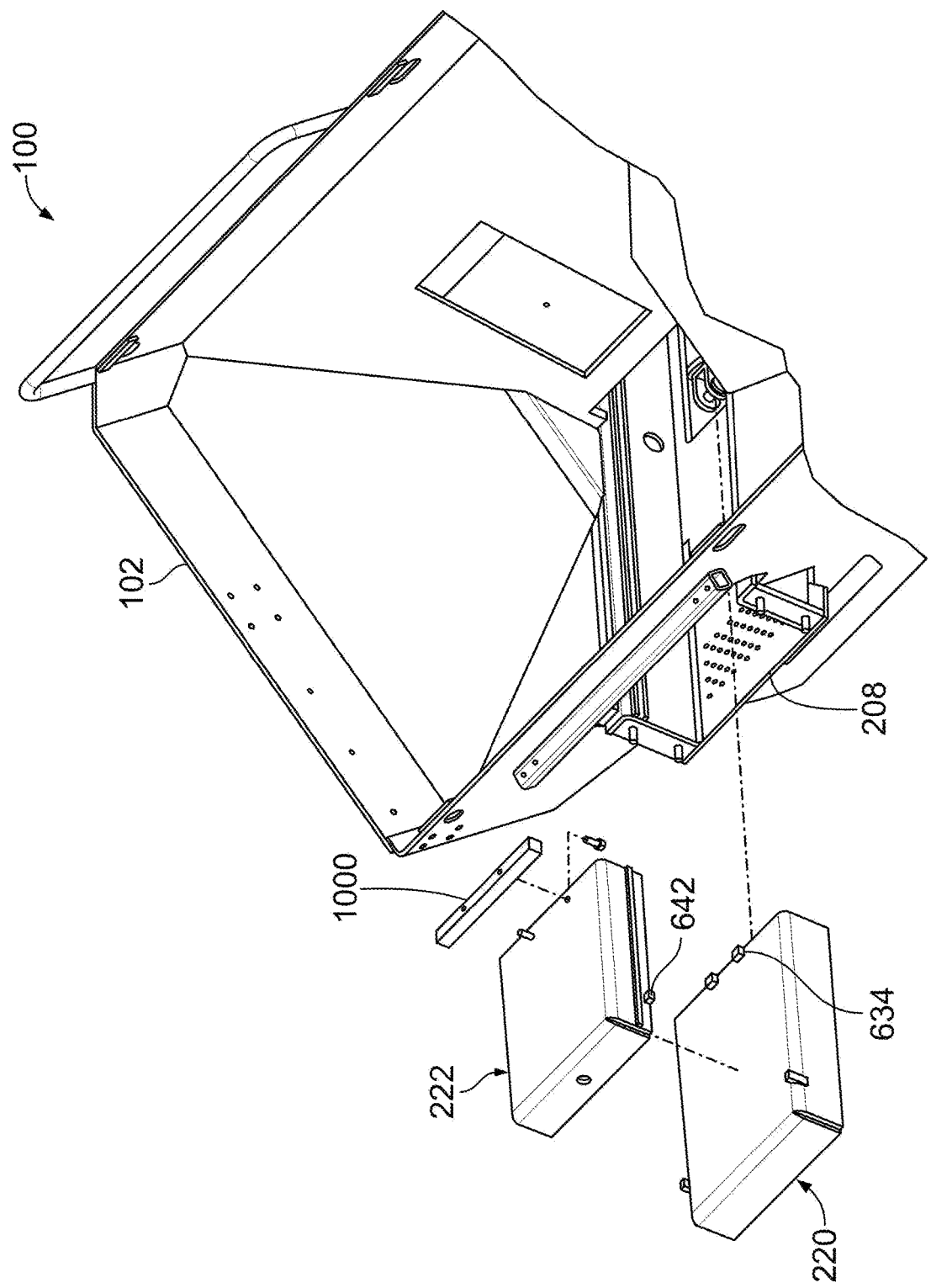
FIG. 10 is a partially exploded view of the delivery system of FIG. 1.

Referring now to FIG. 10, the upper ram can be provided with a travel stop 1000. The travel stop may take the form of a bar or plate that extends perpendicularly from the body of the upper ram. The travel stop can be positioned in proximity to stationary components or structures of the container. The travel stop may be positioned to limit motion of the upper ram with respect to the trough during the cyclic operation of the multi-stage ram assembly.

Figure 11A:
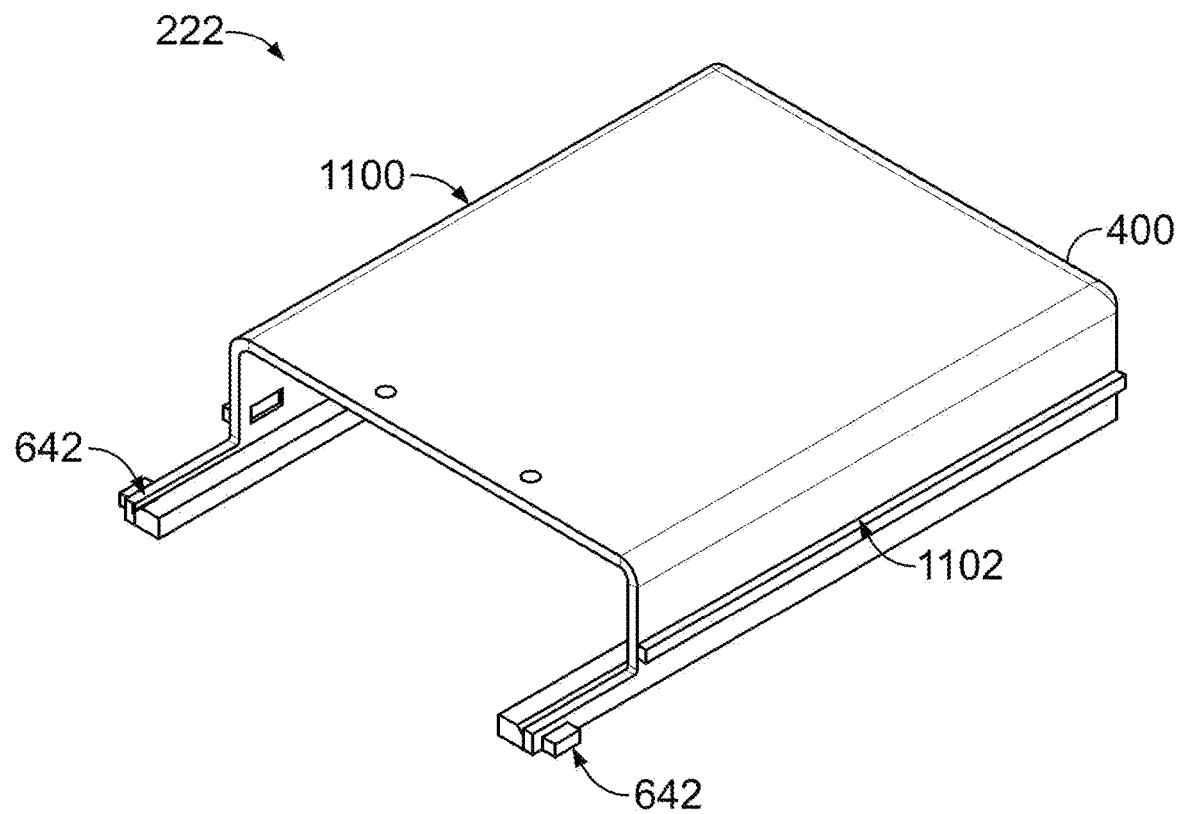
FIG. 11A is a perspective view of an upper ram that can be used in the delivery system of FIG. 10.
Figure 11B:
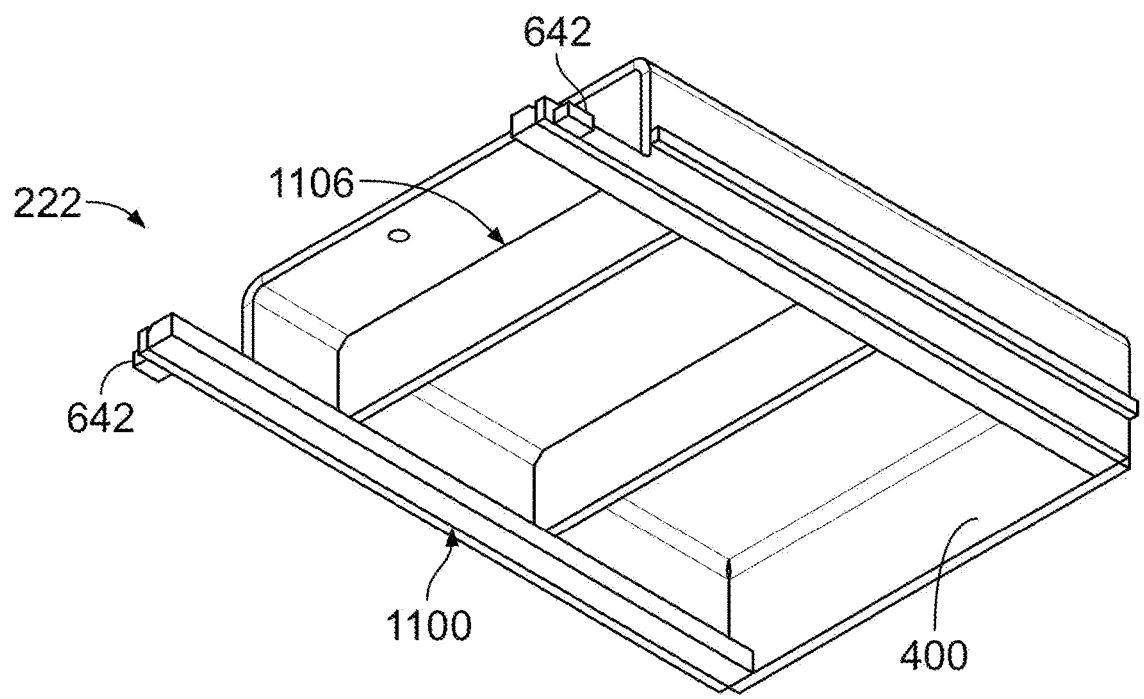
FIG. 11B is another perspective view of the upper ram of FIG. 11A.

Turning now to FIGS. 11A and 11B, the upper ram can be a hollow body having lateral sides forming walls of the hollow body. The lateral sides can be provided with a guide rail 1102 formed along the length of the lateral side. The guide rail may be adapted to operably couple to the sidewalls (shown in FIG. 2). The upper ram can be provided with one or more stiffening plates. The stiffening plates can be placed within the hollow body of the upper ram to provided structural strength and rigidity.

Figure 12A:
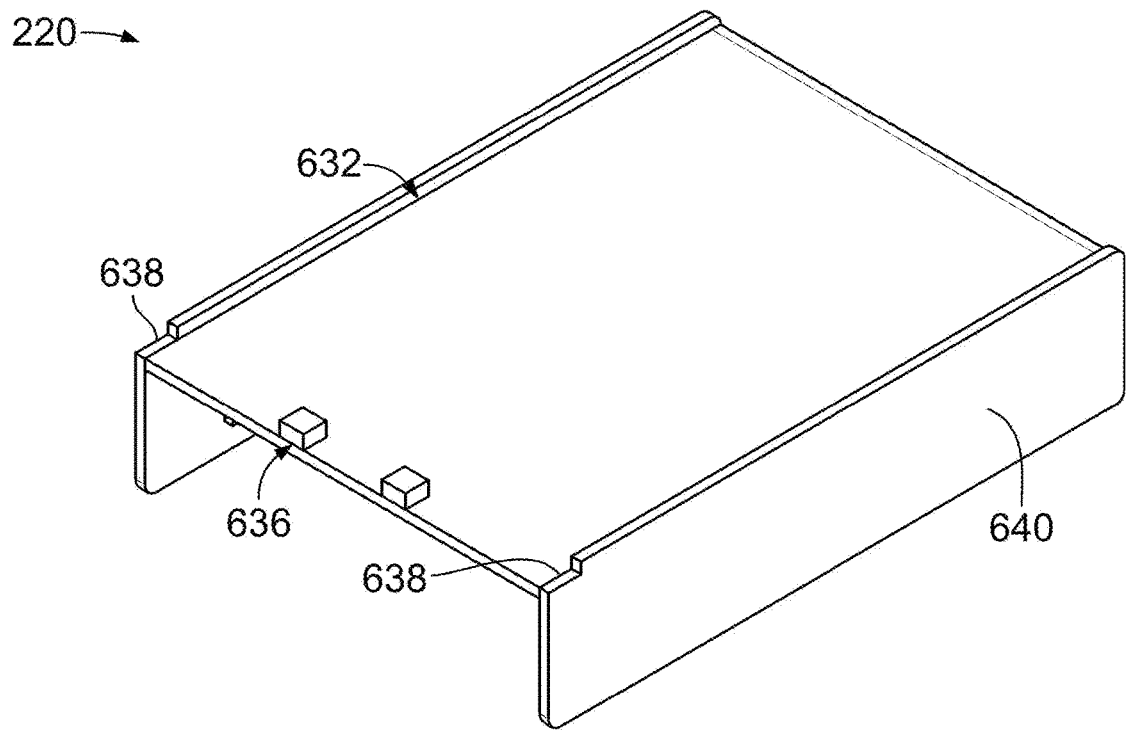
FIG. 12A is a perspective view of a lower ram that can be used in the delivery system of FIG. 10.
Figure 12B:
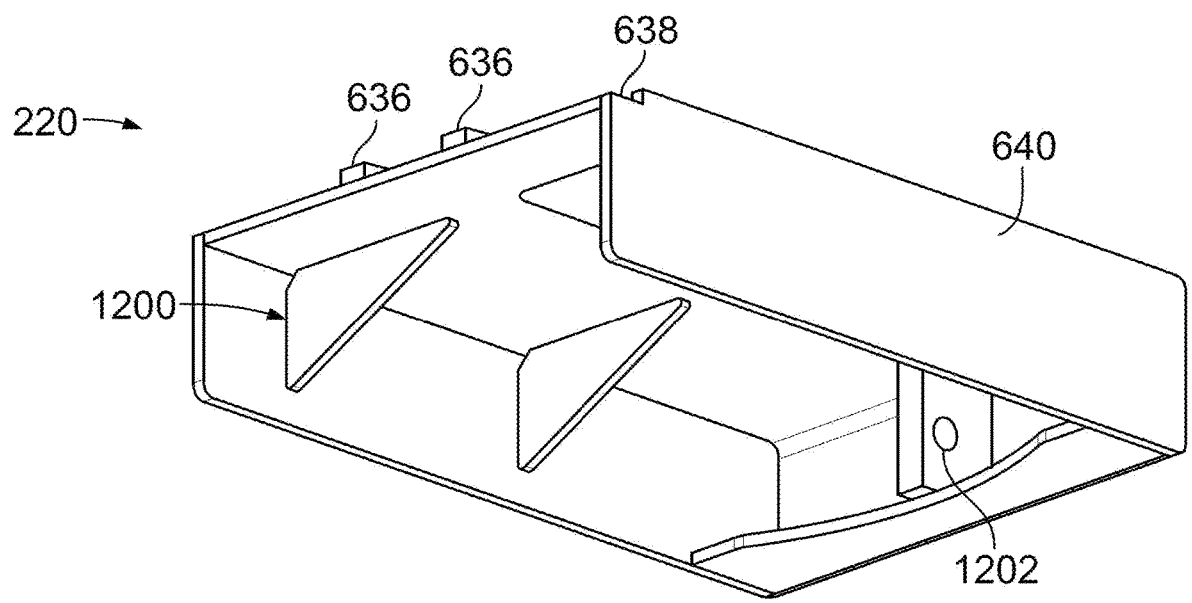
FIG. 12B is another perspective view of the lower ram of FIG. 12A.

Referring now to FIGS. 12A and 12B, the lower ram can be a hollow body having lateral sides extending perpendicularly from the upper surface. In some embodiments, the lateral side extends from the upper surface towards the trough and towards the upper ram. The lateral side can be provided with the cutout in proximity to the upper ram. The lateral side can be provided with one or more support braces 1200 located within the hollow body. The lower ram may include a bracket 1202 located within the hollow body in proximity to the inner leading surface. The bracket can be adapted to couple the actuator to the lower ram.

Provided herein is an assembly having a first ram that can move along a surface in a trough toward an outlet of the trough to move product toward the outlet; a second ram that can be engaged by the first ram as the first ram moves along the surface in the trough, the second ram that can be moved toward the outlet of the trough by the first ram; and an actuator that can move the first ram along the surface toward the outlet of the trough. In some embodiments, the first ram can be located between the surface in the trough and the second ram. In some embodiments, the actuator can directly or indirectly engage the first ram to move the first ram. In some embodiments, the second ram can be engaged and moved by the first ram, the second ram can be indirectly engaged by the actuator. In some embodiments, the first ram includes a first engagement surface that can contact a first receptacle surface of the second ram to push the second ram toward the outlet of the trough. In some embodiments, the first ram includes a second receptacle surface that can contact a second engagement surface of the second ram to pull the second ram away from the outlet of the trough. In some embodiments, the actuator includes a telescoping actuator. In some embodiments, the actuator is a single actuator and both the first ram and the second ram are that can be moved by only the single actuator. In some embodiments, the surface of the trough is angled upward, and the first ram and the second ram can move up the surface toward the outlet of the trough to push the product toward the outlet.

Provided herein is a method including moving a first ram along a surface in a trough toward an outlet of the trough; engaging a second ram with the first ram as the first ram moves along the surface; moving both the first ram and the second ram along the surface following engagement of the second ram by the first ram; and moving product in the trough toward the outlet using the first ram and the second ram. In some embodiments, moving the first ram includes moving the first ram between the second ram and the surface. In some embodiments, moving the first ram includes directly or indirectly engaging the first ram with an actuator that moves the first ram. In some embodiments, moving both the first ram and the second ram includes moving the first ram farther along the surface than the second ram. In some embodiments, moving the first ram includes moving the first ram in a first direction along the surface and moving both the first ram and the second ram includes moving the first ram and the second ram in the first direction along the surface, and further including moving the first ram and the second ram along the surface in a second direction following moving the product toward the outlet.

Provided herein is a system having a trough having a ramp surface leading to an outlet of the trough, the trough shaped to hold a product that is shaped to be moved from the trough via the outlet; and a single actuator, dual ram assembly operably coupled with the tough, the assembly includes a lower ram that can move along the ramp surface in the trough toward the outlet of the trough to move the product toward the outlet; an upper ram can be engaged by the lower ram as the lower ram moves along the ramp surface, the upper ram can be moved toward the outlet of the trough by the lower ram; and an actuator that can push the lower ram along the ramp surface toward the outlet of the trough and to pull the lower ram along the ramp surface away from the outlet of the trough. In some embodiments, the upper ram can be indirectly engaged and moved by the actuator via the lower ram. In some embodiments, the lower ram includes a forward engagement surface that can contact a rearward receptacle surface of the upper ram to push the upper ram toward the outlet of the trough. In some embodiments, the lower ram includes a rearward receptacle surface that can contact a forward engagement surface of the upper ram to pull the upper ram away from the outlet of the trough. In some embodiments, the actuator includes a telescoping actuator. In some embodiments, the assembly can move one or more of rail anchors, ballast material, or rail spikes in the trough toward the outlet.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein."

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly comprising:
  a first ram configured to move along a surface in a trough toward an outlet of the trough to move product toward the outlet, the first ram comprising an engagement surface positioned at an end of the first ram;
  a second ram configured to be engaged by the engagement surface of the first ram as the first ram moves along the surface in the trough, the second ram configured to be moved toward the outlet of the trough by the engagement surface of the first ram; and
  an actuator configured to move the first ram along the surface toward the outlet of the trough.

2. The assembly of claim 1, wherein the first ram is configured to be located between the surface in the trough and the second ram.

3. The assembly of claim 1, wherein the actuator is configured to directly or indirectly engage the first ram to move the first ram.

4. The assembly of claim 1, wherein the second ram is configured to be engaged and moved by the first ram, the second ram configured to be indirectly engaged by the actuator.

5. The assembly of claim 1, wherein the first ram includes a receptacle surface configured to contact an engagement surface of the second ram to pull the second ram away from the outlet of the trough.

6. The assembly of claim 1, wherein the actuator includes a telescoping actuator.

7. The assembly of claim 1, wherein the actuator is a single actuator and both the first ram and the second ram are configured to be moved by only the single actuator.

8. The assembly of claim 1, wherein the surface of the trough is angled upward, and the first ram and the second ram are configured to move up the surface toward the outlet of the trough to push the product toward the outlet.

9. A method comprising:
  moving a first ram along a surface in a trough toward an outlet of the trough;
  engaging a second ram with an engagement surface positioned at an end of the first ram as the first ram moves along the surface;
  moving both the first ram and the second ram along the surface following engagement of the second ram by the engagement surface of the first ram; and
  moving product in the trough toward the outlet using the first ram and the second ram.

10. The method of claim 9, wherein moving the first ram includes moving the first ram between the second ram and the surface.

11. The method of claim 9, wherein moving the first ram includes directly or indirectly engaging the first ram with an actuator that moves the first ram.

12. The method of claim 9, wherein moving both the first ram and the second ram includes moving the first ram farther along the surface than the second ram.

13. The method of claim 9, wherein moving the first ram includes moving the first ram in a first direction along the surface and moving both the first ram and the second ram includes moving the first ram and the second ram in the first direction along the surface, and further comprising:
  moving the first ram and the second ram along the surface in a second direction following moving the product toward the outlet.

14. A system comprising:
  a trough having a ramp surface leading to an outlet of the trough, the trough shaped to hold a product that is shaped to be moved from the trough via the outlet; and
  a single actuator, dual ram assembly operably coupled with the tough, the assembly comprising:
    a lower ram configured to move along the ramp surface in the trough toward the outlet of the trough to move the product toward the outlet, the lower ram comprising an engagement surface positioned at an end of the lower ram;
    an upper ram configured to be engaged by the engagement surface of the lower ram as the lower ram moves along the ramp surface, the upper ram configured to be moved toward the outlet of the trough by the engagement surface of the lower ram; and
    an actuator configured to push the lower ram along the ramp surface toward the outlet of the trough and to pull the lower ram along the ramp surface away from the outlet of the trough.

15. The system of claim 14, wherein the upper ram is configured to be indirectly engaged and moved by the actuator via the lower ram.

16. The system of claim 14, wherein the lower ram includes a receptacle surface configured to contact an engagement surface of the upper ram to pull the upper ram away from the outlet of the trough.

17. The system of claim 14, wherein the actuator includes a telescoping actuator.

18. The system of claim 14, wherein the assembly is configured to move one or more of rail anchors, ballast material, or rail spikes in the trough toward the outlet.

* * * * *